US008673503B2

(12) United States Patent
Balaji et al.

(10) Patent No.: US 8,673,503 B2
(45) Date of Patent: Mar. 18, 2014

(54) POLYURETHANE GEL ELECTROLYTES WITH IMPROVED CONDUCTANCE AND/OR SOLVENT RETENTION

(75) Inventors: Ramamurthy Balaji, Tamilnadu (IN); Ajit R. Kulkarni, Mumbai (IN); Raman S. Srinivasa, Mumbai (IN)

(73) Assignee: Indian Institute of Technology Bombay, Mumbai (IN)

( * ) Notice: Subject to any disclaimer, the term of this patent is extended or adjusted under 35 U.S.C. 154(b) by 596 days.

(21) Appl. No.: 12/794,261

(22) Filed: Jun. 4, 2010

(65) Prior Publication Data

US 2011/0300450 A1   Dec. 8, 2011

(51) Int. Cl.
*H01M 6/14* (2006.01)
(52) U.S. Cl.
USPC ........... 429/303; 429/188; 429/300; 429/309; 429/324; 429/231.95
(58) Field of Classification Search
USPC ......... 429/134, 188, 300, 303, 307, 309, 324, 429/326, 342, 344, 231.9, 231.95
See application file for complete search history.

(56) References Cited

U.S. PATENT DOCUMENTS

| | | | |
|---|---|---|---|
| 6,841,303 | B2 | 1/2005 | Park et al. |
| 2005/0231894 | A1* | 10/2005 | Yoshida et al. ............... 361/502 |
| 2009/0068388 | A1* | 3/2009 | Tanaka et al. ................ 428/41.3 |
| 2010/0129721 | A1 | 5/2010 | Xu et al. |
| 2010/0310911 | A1* | 12/2010 | Yamamoto et al. ............ 429/94 |

FOREIGN PATENT DOCUMENTS

| | | |
|---|---|---|
| CN | 101714659 | 5/2010 |
| KR | 20100035870 | 4/2010 |

OTHER PUBLICATIONS

Addonizio, M.L., et al., "Study of the non-isothermal crystallization of poly(ethylene oxide)/poly(methyl methacrylate) blends," Polymer, vol. 28, Issue 2, Feb. 1987, pp. 183-188.
Chintapalli, S., et al. "Effect of plasticizers on high molecular weight PEO-LiCF3SO3 complexes," (1996) Solid State Ionics, 86-88 (1986), pp. 341-346.
Choi, B.K., et al., "Lithium ion conduction in PEO—salt electrolytes gelled with PAN," Solid State Ionics 113-115 (1998) 123-127.
Deepa, M., et al., "Ion-pairing effects and ion—solvent—polymer interactions in LiN(CF3SO2)2—PC—PMMA electrolytes: a FTIR study," Electrochimica Acta, vol. 49, Issue 3, Jan. 30, 2004, pp. 373-383.
Durig, J.R., et al., "Far-infrared spectra and structure of small ring compounds. Ethylene carbonate, γ-butyrolactone, and cyclopentanone," Journal of Molecular Spectroscopy, vol. 27, Issues 1-4, Sep. 18, 1968, pp. 285-295.
Durig, J.R., et al., "Vibrational spectra and structure of small ring compounds: XVII. Far infrared and matrix spectra of vinylene carbonate," Journal of Molecular Structure, vol. 5, Issues 1-2, Feb. 1970, pp. 67-84.

(Continued)

*Primary Examiner* — Patrick Ryan
*Assistant Examiner* — Ben Lewis
(74) *Attorney, Agent, or Firm* — Moritt Hock & Hamroff LLP; Steven S. Rubin, Esq.

(57) ABSTRACT

Disclosed are gel electrolytes comprising a polymer, which is a cross-linked polyurethane prepared from a poly(alkyleneoxide) triol and a diisocyanate compound; a lithium salt; and a solvent, which is a carbonate solvent, a lactone solvent, or mixtures thereof.

18 Claims, 6 Drawing Sheets

(56) References Cited

OTHER PUBLICATIONS

Fortunato, B., et al., "Infrared and Raman spectra and vibrational assignment of ethylene carbonate," Spectrochimica Acta Part A: Molecular Spectroscopy, vol. 27, Issue 9, Sep. 1971, pp. 1917-1927.

Privalko, V.P., et al., "Miscible polymer blends: 1. Thermodynamics of the blend melts poly(methyl methacrylate)-poly (ethylene oxide) and poly(methyl methacrylate)-poly(vinylidene flouride)," Polymer, vol. 31, Issue 7, Jul. 1990, pp. 1277-1282.

Song, J. Y., et al., "Review of gel-type polymer electrolytes for lithium-ion batteries," Journal of Power Sources, vol. 77, No. 2, Feb. 1999, pp. 183-197(15).

Wang, J., et al., "Ion-molecule interactions in solutions of lithium perchlorate in propylene carbonate+diethyl carbonate mixtures: an IR and molecular orbital study", Spectrochimica Acta Part A, 58 (2002) 2097-2104.

Wang, Z., "Infrared spectroscopic study of the interaction between lithium salt LiClO4 and the plasticizer ethylene carbonate in the polyacrylonitrile-based electrolyte," Solid State Ionics, vol. 85, Issues 1-4, May 1996, pp. 143-148.

International Search Report and Written Opinion prepared by the Australian Patent Office for PCT/IB2010/002105 completed Nov. 25, 2010.

Abbrent, S., et al., "Crystallinity and morphology of PVdF-HFP-based gel electrolytes," Polymer 42 (2001) 1407-1416.

Balaji, R., "Synthesis and Electrical Properties of Gel Polymer Electrolytes," Ph.D. Thesis, IIT Bombay, 2008.

Bashir, Z., et al., "The formation of polymer-solvent complexes of polyacrylonitrile from organic solvents containing carbonyl groups," Acta polymer., 44, 211-218 (1993).

Choi, B.K., et al., "Ionic conduction in PEO-PAN blend polymer electrolytes," Electrochimica Acta 45 (2000) 1371-1374.

Hayamizu, K., et al., "Diffusion, conductivity and DSC studies of a polymer gel electrolyte composed of cross-linked PEO, y-butyrolactone LiBF4," Solid State Ionics 107 (1998) 1-12.

Rajendran, S., et al., "Experimental investigations on PAN-PEO hybrid polymer electrolytes," Solid State Ionics 130 (2000) 143-148.

Yoshimoto, N., et al, "Ionic conductance of gel electrolyte using a polyurethane matrix for rechargeable lithium batteries," Electrochimica Acta 50 (2004) 275-279.

Wen, T-C., et al., "Ionic conductivity of polymer electrolytes derived from various diisocyanate-based waterborne polyurethanes," Polymer, 2000, pp. 6755-6764, vol. 41, Issue 18.

\* cited by examiner

POLYURETHANE GEL ELECTROLYTES WITH IMPROVED CONDUCTANCE AND/OR SOLVENT RETENTION

FIELD

The present disclosure provides a polyurethane (PU) based gel electrolyte having improved conductivity, high mechanical strength and high solvent retention.

BACKGROUND

A battery is a device that converts chemical energy into electrical energy by means of an electrochemical reaction. With the ever-increasing market for portable electronic devices, such as cell-phones, laptop computers, there is also an increased need for improved energy sources. Most of the electronic products today use "state-of-the-art" batteries, and yet the performance of these leaves much to be desired. Another aspect is the environmental threat posed by the heavy metals used in many of today's batteries. As society is becoming more aware of these problems, the desire for environmentally friendly battery components is growing.

Many of the electrical devices that consumers demand are limited by their power source. From electric vehicles to cellular phones, advances in battery technology have not kept pace with the power requirements of electrical devices. Lithium metal batteries have been targeted as the next generation power sources for these devices, since lithium has the most electropositive potential (−3.04 V versus standard hydrogen electrode), lowest equivalent weight (6.94 g/mol), lowest specific gravity (0.53 g/cm$^3$) and highest mass ratio. These properties facilitate the design of storage systems with higher energy density compared with other battery systems.

A battery includes at least three main components: cathode, electrolyte and anode. The cathode is the electrode where a reduction reaction occurs, whereas the anode is the electrode where an oxidation reaction occurs. The electrolyte is an electronic insulator, but a good ionic conductor; one main function is to provide a transport medium from one electrode to the other. Although significant progress has been made in the development of batteries, several important factors, such as the electrolyte, have limited their commercial use.

Electrolytes should be chemically and electrochemically stable, mechanically strong, safe and inexpensive. Liquid electrolytes facilitate high-ionic mobility; however, due to safety concerns involving leakage and flammability, the use of liquid electrolytes in lithium battery systems has often been deterred. While solid electrolytes, such as ceramic and polymer electrolyte, prevent the formation of vapor-pressure and leakage problems, ionic transport within these materials is often too slow for typical battery applications. Ideally, an electrolyte would have the electrical properties of a liquid and the mechanical properties of a solid. Such an electrolyte would serve both as electrolyte and separator and provide the battery with mechanical flexibility, a property unattainable in cells with conventional liquid electrolytes.

Gel electrolytes possess both the cohesive properties of solids and the diffusive transport properties of liquids. This duality enables the gel to find a variety of important applications. Gels can be obtained as a result of either a chemical or a physical linking process. The use of substantial amounts of plasticizers in gel electrolyte gave rise to problems of mechanical strength and exudation of solvent which lead to thermal, chemical and electrochemical instability.

SUMMARY

Thus, in a broad aspect, the example embodiments provide polyurethane (PU) based gel electrolytes having one or more of improved conductivity, high mechanical strength and high solvent retention.

One aspect of the example embodiments provides a gel electrolyte including a polymer, wherein the polymer is a polyurethane prepared from a poly(alkyleneoxide) triol and a diisocyanate compound; and the polymer is sufficiently cross-linked to form a gel in the presence of the solvent.

In another aspect, the illustrative embodiments provide a gel electrolyte comprising:

a polymer in about 20 to about 70 wt %;
a lithium salt in about 1 to about 8 wt %; and
a solvent comprising a carbonate solvent, a lactone solvent, or a mixture thereof;
wherein the polymer is a polyurethane prepared from a poly(alkyleneoxide) triol and a diisocyanate compound; and the polymer is sufficiently cross-linked to form a gel in the presence of the solvent.

Another aspect of the embodiments provides a battery comprising any gel electrolyte of the embodiments.

Yet another aspect of the embodiments provides a method for preparing any gel electrolyte of the embodiments.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
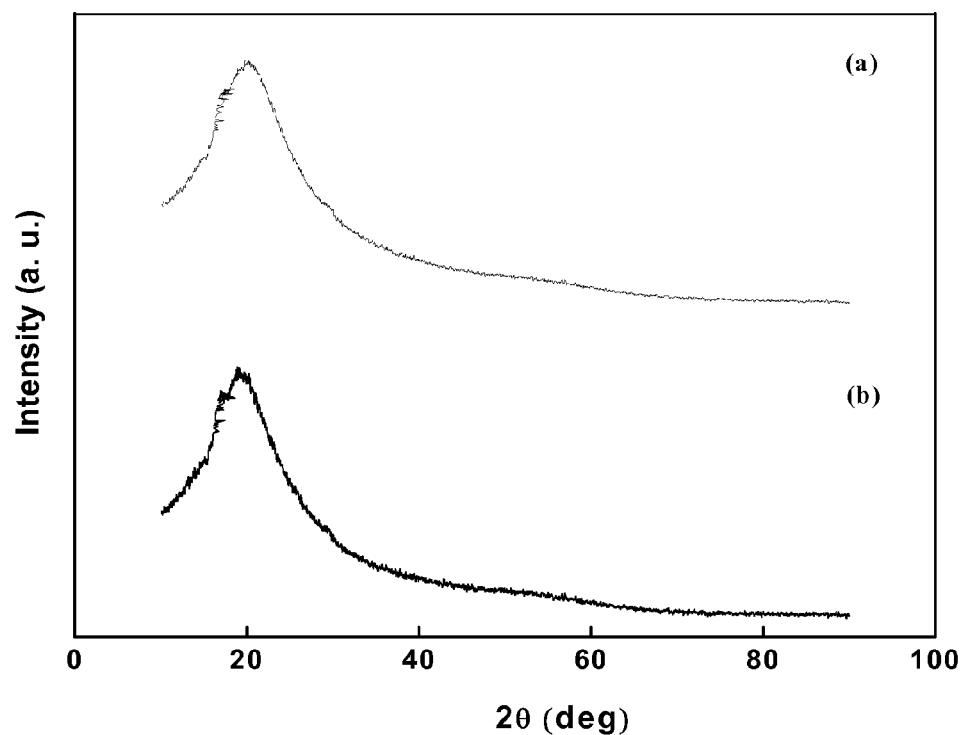
FIG. 1 illustrates XRD pattern of typical PU based gel electrolytes of an example embodiment; (a) is sample PU2_PC60 and (b) is sample PU2_PC35.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and are made part of this disclosure.

Thermoplastic polyurethane (PU) has limited capacity to contain solvents used in gel electrolytes; however, cross-linked PUs are known to hold more solvent and have higher lithium ion conductivities compared to thermoplastic PU. It is difficult to control the thickness of the cross-linked PU due to the random nature of the polymer reaction during the synthesis. The illustrative embodiments disclose a cross-linked PU based gel system where the thickness is controlled. The design of the gel is based on optimization of the electrical conductivity. The design is also based on optimization of the solvent exudation properties.

In one aspect, the disclosure provides a gel electrolyte including:
 a polymer in about 20 to about 70 wt %;
 a lithium salt in about 1 to about 8 wt. %; and
 a solvent including a carbonate solvent, a lactone solvent, or a mixture thereof;
wherein the polymer is a polyurethane prepared from a poly(alkyleneoxide) triol and a diisocyanate compound; and the polymer is sufficiently cross-linked to form a gel in the presence of the solvent.

Poly(alkyleneoxide) triols (PAO triols) selected from a wide range of molecular weights may be used in the methods of the examples. Unless otherwise defined, polymer molecular weights noted herein are weight-averaged molecular weights ($M_w$). Particular PAO triols useful in the example embodiments are those having molecular weights of from about 1,000 to about 100,000 g/mol. Some particular PAO triols have molecular weights from about 1,000 to about 50,000 g/mol. Other particular PAO triols have molecular weights from about 1,000 to about 10,000 g/mol. Some particular PAO triols have molecular weights from about 3,000 to about 7,000 g/mol. In still other embodiments, the molecular weight of the PAO triol is about 4,000 to about 5,000 g/mol. In still other embodiments, the molecular weight of the PAO triol is about 4,500 g/mol. In still other embodiments, the molecular weight of the PAO triol is less than 5,000 g/mol. Mixtures of PAO triols with different molecular weights can also be used.

In one example embodiment, the disclosure provides gel electrolyte as described above, wherein the poly(alkyleneoxide) triol is glycerin-type poly(alkyleneoxide).

In another embodiment, the disclosure provides gel electrolyte as described above, wherein the poly(alkyleneoxide) triol is glycerin-type poly(ethyleneoxide), glycerin-type poly(propyleneoxide), poly(ethyleneoxide) capped glycerin-type poly(propyleneoxide); and poly(propyleneoxide) capped glycerin-type poly(ethyleneoxide). Illustratively, the poly(alkyleneoxide) triol is selected from:

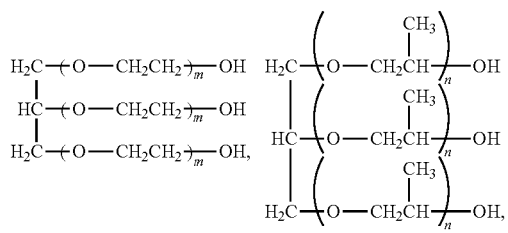

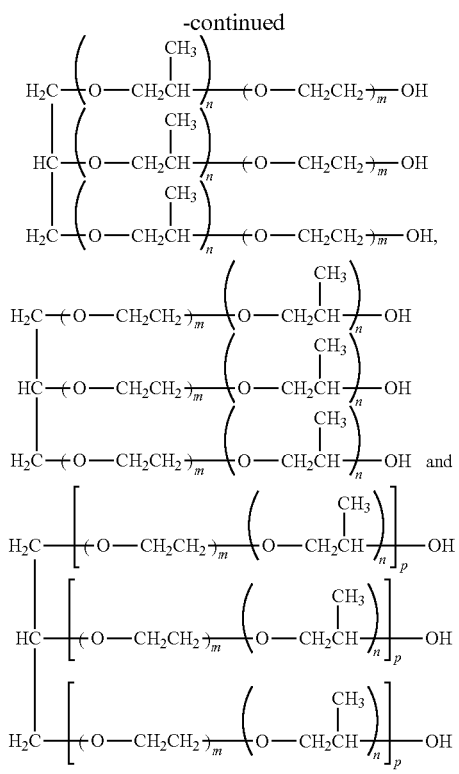

where m, n, and p are selected to form a polymer having molecular weight of about 1,000 to about 100,000 g/mol.

In one embodiment, the disclosure provides gel electrolyte as described above, wherein the poly(alkyleneoxide) triol is:

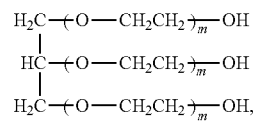

where m is selected to form a polymer having molecular weight of about 1,000 to about 100,000 g/mol.

In one embodiment, the disclosure provides gel electrolyte as described above, wherein the diisocyanate compound is selected from: methylenediphenyl diisocyante (MDI), p-phenylene diisocyante (PPDI), toluene diisocyanate (TDI), o-tolidine diisocyanate (TODI), xylylene diisocyanate (XDI), 1,5-naphthalene diisocyanate (NDI), 3,3'-dichloro-4,4'-diphenylmethane diisocyanate, hexamethylene diisocyanate (HDI), isophorone diisocyanate (IPDI), 4,4'-dicyclohexylmethane diisocyanate and hydrogenated xylylene diisocyanate. A mixture of two or more different diisocyanate compounds can also be used. In a particular embodiment, the diisocyanate compound is 4,4'-methylenediphenyl diisocyante (MDI).

In another embodiment, the diisocyanate compound of the disclosure is polymeric methylenediphenyl diisocyante (polymeric MDI). Example of polymeric MDI is SUPRASEC 2525 available from Huntsman, India. Polymeric MDI are selected from a wide range of molecular weights may be used in the methods of the example embodiment. Unless otherwise defined, polymers molecular weights noted herein are weight-averaged molecular weights ($M_w$). Particular polymeric MDI useful in the examples are those having molecular weights of from about 1,000 to 100,000 g/mol. Other particular polymeric MDI have molecular weights from about 1,000 to 10,000 g/mol. In still other embodiments, the molecular weight of the polymeric MDI is about 4,000 to 5,000 g/mol. In still other embodiments, the molecular weight of the polymeric MDI is about 4,500 g/mol. Mixtures of polymeric MDI with different molecular weights can also be used.

In another embodiment, the disclosure provides a gel electrolyte as described above wherein the polymer is in about 15 to about 75 wt %. In other embodiment, a gel electrolyte includes a polymer in about 25 to about 65 wt %. In another embodiment, a gel electrolyte has a polymer in about 30 to about 68 wt % In yet another embodiment, a gel electrolyte has a polymer in about 30 to about 55 wt %. In some embodiments, a gel electrolyte has a polymer in about 50 to about 65 wt %. In other embodiments, a gel electrolyte includes a polymer in about 40 to about 55 wt %. In yet another embodiment, a gel electrolyte has a polymer in about 30 to about 40 wt %. In yet another embodiment, a gel electrolyte includes a polymer in about 35 wt %.

Various lithium salts may be used in the methods of the example embodiment. For example, lithium salts include, but are not limited to lithium halides, lithium-metal salts, and other lithium compounds. Lithium halides include lithium bromide, lithium chloride, and lithium iodide. Lithium-metal salts include, but are not limited to lithium hexafluoroarsenate(V), and lithium hexafluorophosphate. Other lithium compounds include, but are not limited to bis(trifluoromethane) sulfonimide lithium salt, lithium borohydride, lithium dihydrogenphosphate, lithium tetrafluoroborate, lithium metaborate, lithium perchlorate, lithium thiophenolate, and lithium trifluoromethanesulfonate.

In one embodiment, the disclosure provides gel electrolyte as described above, wherein the lithium salt may include one or more of lithium perchlorate, lithium trifluoromethanesulfonate, lithium hexafluorophosphate, and lithium tetrafluoroborate.

In another embodiment, the disclosure provides gel electrolyte as described above, wherein the lithium salt is lithium perchlorate.

The disclosure also provides gel electrolyte as described above, wherein the lithium salt is present in about 2 to about 7 wt %. In some embodiments, the lithium salt is present in about 3 to about 6 wt %. In yet another embodiment, the lithium salt is present in about 5 to about 6 wt %. In yet another embodiment, the lithium salt is present in about 3 to about 5 wt %.

The disclosure also provides gel electrolyte as described above, wherein the lithium salt is present in about 1:15 to about 1:10 molar ratio relative to the solvent (i.e., the molar ratio of Li cation to the solvent is about 1:15). In some embodiments, the lithium salt is present in about 1:13 to about 1:11 molar ratio relative to the solvent. In yet another embodiment, the lithium salt is present in about 1:12 molar ratio relative to the solvent.

In a particular embodiment, the disclosure provides a gel electrolyte as described above wherein the solvent is the carbonate solvent. The carbonate solvent includes but is not limited to dimethyl carbonate, methyl ethyl carbonate, diethyl carbonate, dipropyl carbonate, dibutyl carbonate, propylene carbonate, ethylene carbonate, butylene carbonate, vinylene carbonate, and mixtures thereof.

In one embodiment, the disclosure provides gel electrolyte as described above, wherein the solvent is propylene carbonate, ethylene carbonate, or a mixture thereof. In a particular embodiment, the solvent is propylene carbonate. In another embodiment, the solvent is ethylene carbonate. In yet another embodiment, the disclosure provides gel electrolyte as described above, wherein the solvent is a mixture of propylene carbonate and ethylene carbonate in a 1:10; or 1:9; or 1:8; or 1:7; or 1:6; or 1:5; or 1:4; or 1:3; or 1:2; or 1:1; or 2:1; or 3:1; or 4:1; or 5:1; or 6:1; or 7:1; or 8:1; or 9:1 or 10:1 molar ratio. In yet another embodiment, the disclosure provides gel electrolyte as described above, wherein the solvent is a mixture of propylene carbonate and ethylene carbonate in a 1:1 molar ratio.

In a particular embodiment, the disclosure provides a gel electrolyte as described above wherein the solvent is the lactone solvent. The lactone solvent includes but is not limited to β-propiolactone, γ-butyrolactone, α-methyl-γ-butyrolactone, γ-crotonolactone, δ-valerolactone, γ-valerolactone, γ-caprolactone, ε-caprolactone, ethylated γ-butyrolactone, propylated γ-butyrolactone, and mixtures thereof.

In one embodiment, the disclosure provides gel electrolyte as described above, wherein the solvent is γ-butyrolactone.

In another embodiment, the disclosure provides gel electrolyte as described above, wherein the solvent is a mixture of the carbonate solvent and the lactone solvent. In a particular embodiment, the solvent is a mixture of propylene carbonate or ethylene carbonate, and γ-butyrolactone. In another embodiment, the solvent is a mixture of the carbonate solvent and the lactone solvent is in a 1:1 molar ratio.

In one embodiment, the disclosure provides gel electrolyte as described above, wherein the solvent is a mixture of propylene carbonate and γ-butyrolactone in a 1:1 molar ratio.

In another embodiment, the disclosure provides gel electrolyte as described above, wherein the solvent is a mixture of ethylene carbonate and γ-butyrolactone in a 1:1 molar ratio.

The disclosure also provides gel electrolyte as described above wherein poly(alkyleneoxide) triol and the diisocyanate compound are in about 1:1 to about 1.2:1 molar ratio. In one embodiment, the molar ratio of poly(alkyleneoxide) triol and the diisocyanate compound is about 1.1:1.

The disclosure provides gel electrolyte as described above including:
a polymer in about 30 to about 40 wt %;
a lithium salt in about 4 to about 5.5 wt. %; and
a solvent including a carbonate solvent, a lactone solvent, or a mixture thereof;
wherein the polymer is a polyurethane prepared from a poly(ethyleneoxide) triol and methylenediphenyl diisocyante (MDI) in a 1.1:1 molar ratio; and the polymer is sufficiently cross-linked to form a gel in the presence of the solvent. In this aspect, lithium salt, solvent, and solvent contents may be selected as described above for the preceding aspect of the example embodiments.

The disclosure also provides gel electrolyte as described above having:
a polymer in about 30 to about 40 wt %;
a lithium perchlorate in about 4 to about 5.5 wt. %; and
a solvent including a carbonate solvent, a lactone solvent, or a mixture thereof;
wherein the polymer is a polyurethane prepared from a poly(ethyleneoxide) triol and methylenediphenyl diisocyante (MDI) in a 1.1:1 molar ratio; and the polymer is sufficiently cross-linked to form a gel in the presence of the solvent.

The gel electrolytes of the disclosure can be used in a variety of applications, such as batteries, electrochemical capacitors, and electrochromic displays. Examples of electrochromic display devices or applications for which gel electrolytes can be particularly suitable include, but are not limited to helmets, mirrors, optical shutters, windows, glasses, goggles, color changeable eyewear, automotive windows, aircraft windows, welding visors or other devices that can change optical or electromagnetic transmission as a result of an applied potential. Additional examples include readable displays and super/ultra capacitors for power storage.

In a particular embodiment, the disclosure provides a battery comprising a gel electrolyte as described above.

The disclosure also provides method for preparing the gel electrolyte as described above. In a particular embodiment, the disclosure provides a method for preparing the gel electrolyte as described above, comprising:

(a) adding a lithium salt to a solvent comprising a carbonate solvent, a lactone solvent, or a mixture thereof to form a liquid electrolyte; and
(b) adding a polymer to the liquid electrolyte.

The cross-linking density of the polyurethanes prepared according to the methods described herein can be a function of a number of parameters which are familiar to those skilled in the art. For example, the cross-linking density can depend on one of more of: (1) the stoichiometric balance or imbalance of the alcohol and isocyanate reactive groups of the triol and diisocyanate, respectively; (2) the accessibility and/or reactivity of the individual end groups under the reaction conditions; and (3) the extent of the polymerization reaction between the triol and diisocyante, which can be controlled by changing the temperature and/or duration of the polymerization. The cross-linking density can be qualitatively analyzed using Dynamic Mechanical Analysis (DMA) and Small Angle X-ray Scattering (SAXS) measurements. The cross-linking density can be controlled, for example, by changing the molecular weight of PAO triol and/or the diisocyanate compound, or by changing the composition. The polyurethane of the disclosure should be sufficiently cross-linked to form a gel when mixed with or prepared in the presence of the solvent.

EXAMPLES

The preparation of the gel electrolytes of the disclosure is illustrated further by the following examples, which are not to be construed as limiting in scope or spirit to the specific procedures and gel electrolytes described in them.

General Procedure

Poly(ethylene oxide) triol (PEO triol) was purchased Korea Polyol Co. (KONIX FA 505) and has the average molecular weight of 4,500. Polymeric MDI was purchased from Huntsman, India (SUPRASEC 2525) and has the average molecular weight of 4,700. The gel electrolytes were prepared by solution casting technique. Conductivity was measured at room temperature using Novocontrol Alpha-N analyzer.

Example 1

PU-PC Based Gel Electrolyte

Propylene carbonate (PC) and lithium perchlorate (LiClO$_4$) were mixed in a molar ratio of 12:1. The liquid electrolyte was stirred at room temperature, and PEO triol (7.4 g) was introduced followed by MDI (1 g). The solution was mixed thoroughly and transferred to a polypropylene plate and kept at room temperature for 24 hours to complete the polymerization leading to the gel formation. The gel electrolytes thus obtained were kept in an oven at 50° C. for 12 hours to remove the excess solvent. The excess solvent lost in this step was estimated to be 1-3 wt %. Conductivity was measured at room temperature, and shown in Table 1. The weight percentages shown in Table 1 are prior to drying.

The polyurethane matrix with isocyanate to hydroxyl groups (NCO:OH) in 1:1 molar ratio for all the PC content shows non-homogeneity and micro phase separation. For the matrix with NCO:OH 1:1.2 molar ratio, uptake of PC content was limited to 45 wt %. Above this solvent content, gel electrolytes are not free standing and start flowing. The polyurethane matrix with NCO:OH 1:1.1 shows maximum of 60 wt % of PC uptake. The gelation time for this composition was about 10 hours. Increase in solvent content increases the conductivity of the gel electrolyte. At this ratio, the gels were homogenous and self standing.

TABLE 1

| Code | polymer NCO:OH molar ratio | polymer content (wt %) | solvent (molar ratio) | solvent content (wt %) | LiClO$_4$ content (wt %) | σDC at RT (S/cm) |
|---|---|---|---|---|---|---|
| PU1_PC30 | 1:1 | 67.40 | PC | 30 | 2.60 | |
| PU1_PC33 | | 64.14 | | 33 | 2.86 | |
| PU1_PC35 | | 61.96 | | 35 | 3.03 | |
| PU1_PC40 | | 56.53 | | 40 | 3.47 | |
| PU1_PC45 | | 51.10 | | 45 | 3.90 | |
| PU1_PC50 | | 45.67 | | 50 | 4.33 | |
| PU1_PC55 | | 40.28 | | 55 | 4.77 | |
| PU1_PC60 | | 34.80 | | 60 | 5.20 | |
| PU1_PC65 | | 29.37 | | 65 | 5.63 | |
| PU2_PC30 | 1:1.1 | 67.40 | PC | 30 | 2.60 | |
| PU2_PC33 | | 64.14 | | 33 | 2.86 | $6.578 \times 10^{-6}$ |
| PU2_PC35 | | 61.96 | | 35 | 3.03 | $2.919 \times 10^{-5}$ |
| PU2_PC40 | | 56.53 | | 40 | 3.47 | $7.891 \times 10^{-5}$ |
| PU2_PC45 | | 51.10 | | 45 | 3.90 | $5.134 \times 10^{-4}$ |
| PU2_PC50 | | 45.67 | | 50 | 4.33 | $9.813 \times 10^{-4}$ |
| PU2_PC55 | | 40.28 | | 55 | 4.77 | $1.560 \times 10^{-3}$ |
| PU2_PC60 | | 34.80 | | 60 | 5.20 | $2.530 \times 10^{-3}$ |
| PU2_PC65 | | 29.37 | | 65 | 5.63 | |
| PU3_PC30 | 1:1.2 | 67.40 | PC | 30 | 2.60 | |
| PU3_PC33 | | 64.14 | | 33 | 2.86 | |
| PU3_PC35 | | 61.96 | | 35 | 3.03 | |
| PU3_PC40 | | 56.53 | | 40 | 3.47 | |
| PU3_PC45 | | 51.10 | | 45 | 3.90 | |
| PU3_PC50 | | 45.67 | | 50 | 4.33 | |
| PU3_PC55 | | 40.28 | | 55 | 4.77 | |
| PU3_PC60 | | 34.80 | | 60 | 5.20 | |
| PU3_PC65 | | 29.37 | | 65 | 5.63 | |

Example 2

PU-γBL Based Gel Electrolyte

PU and γ-butyrolactone (γBL) based gel electrolyte was prepared essentially as described above. γBL and LiClO$_4$ were mixed in a molar ratio of 12:1. Conductivity was measured at room temperature, and shown in Table 2.

Example 3

PU-Mixed Solvent Based Gel Electrolyte

PU with based gel electrolyte was prepared essentially as described above using PC-γBL, PC-ethylene carbonate (EC), and EC-γBL. The molar ratio of mixed solvents was fixed at 1:1; the molar ratio of the solvents to LiClO$_4$ was fixed in a molar ratio of 12:1. Conductivity was measured at room temperature, and shown in Table 2. The weight percentages shown in Table 2 are prior to drying.

TABLE 2

| Code | NCO:OH molar ratio | polymer content (wt %) | solvent (molar ratio) | solvent content (wt %) | LiClO$_4$ content (wt %) | $\sigma_{DC}$ at RT (S/cm) |
|---|---|---|---|---|---|---|
| PU2_γBL | 1:1.1 | 33.84 | γBL | 60 | 6.16 | 1.80 × 10$^{-3}$ |
| PU2_PC_γBL | | 34.30 | PC-γBL (1:1) | 60 | 5.70 | 2.98 × 10$^{-3}$ |
| PU2_PC_EC | | 34.30 | PC-EC (1:1) | 60 | 5.70 | 5.93 × 10$^{-3}$ |
| PU2_EC_γBL | | 33.76 | EC-γBL (1:1) | 60 | 6.24 | 3.91 × 10$^{-3}$ |

Results

The structure and morphology of the PU electrolytes have been studied by Wide Angle X-ray Diffraction (WAXD), Small Angle X-ray Scattering (SAXS), and SEM. The thermal properties of the PU electrolytes have been studied by Differential Scanning Calorimetry (DSC) and Dynamic Mechanical Analysis (DMA). The conductivity properties of the PU electrolytes have been studied by impedance spectroscopy. Different types of Li+ ions existing in these gels have been investigated by Li NMR, and their diffusivities were determined from pulsed field gradient experiments.

Wide Angle X-Ray Diffraction (WAXD):

The WAXD patterns for typical PU gels with 35 and 60 wt % propylene carbonate (PU2_PC35 and PU2_PC60) and are shown in FIG. 1. A weak and broad hump at 2θ value of ~20° is seen in these patterns indicating the presence of an amorphous phase. Complete absence of sharp peaks indicates the absence of any crystalline phase in the gels. It may be noted that the WAXD patterns of other gels with various solvent content (33, 40, 45, 50, 55) were similar to the patterns in FIG. 1.

Figure 2A:
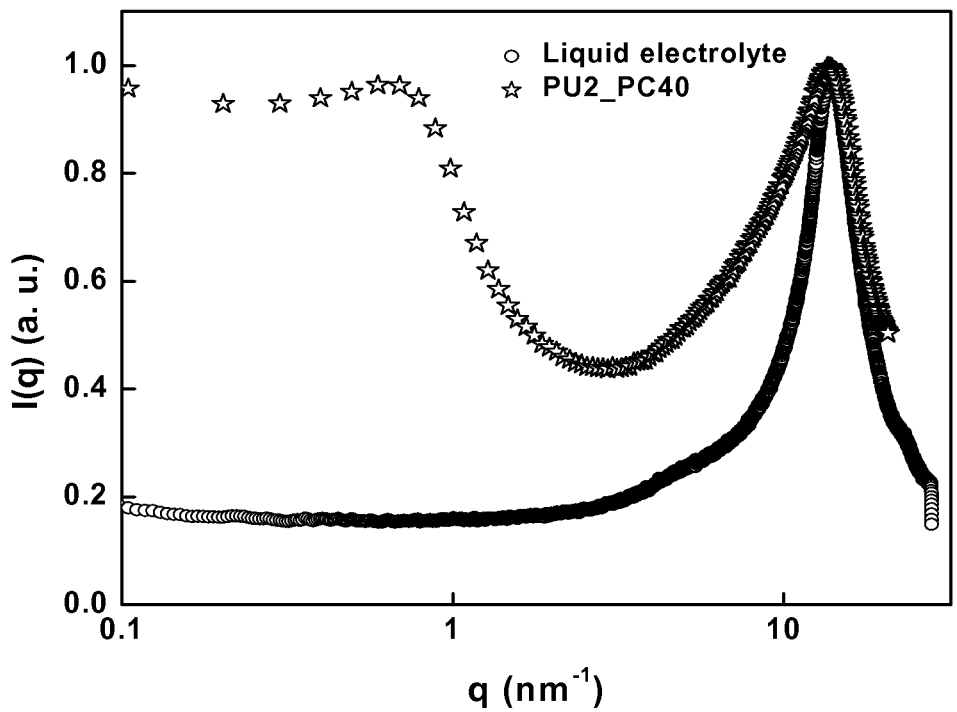
FIG. 2A illustrates an example SAXS pattern of sample PU2_PC40 and its liquid electrolyte.
Figure 2B:
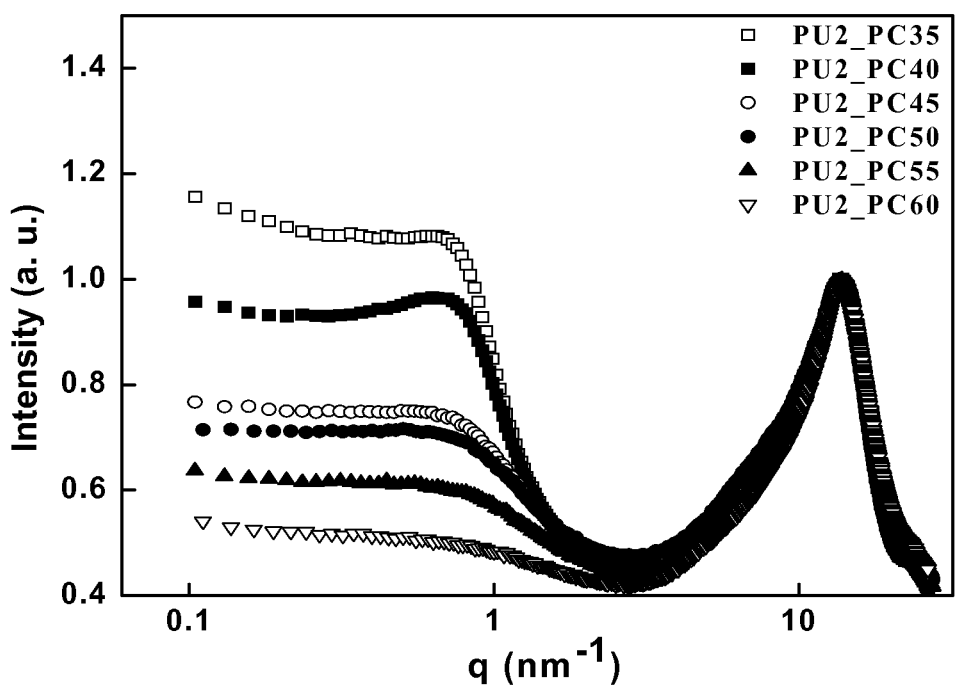
FIG. 2B illustrates SAXS pattern of various PU electrolytes in an example embodiment.

Small Angle X-Ray Scattering (SAXS):

FIG. 2(a) shows the typical SAXS pattern of a PU gel with 40 wt % propylene carbonate (PU2_PC40). The SAXS patterns were recorded up to 30 nm$^{-1}$. The SAXS pattern of polyurethane gel exhibits a broad hump and a strong peak at q value of ~0.7 nm$^{-1}$ and ~14 nm$^{-1}$, respectively. The SAXS pattern of the liquid electrolyte also exhibits a strong peak at q value of ~14 nm$^{-1}$, hence this peak seen in gel electrolyte is attributed to liquid electrolyte. The presence of broad hump at a q value of ~0.7 nm$^{-1}$ indicates the presence of two phase structure, hard segment (HS) and soft segment (SS), in polyurethane matrix. FIG. 2(b) shows the SAXS patterns of gels with different solvent contents in the range 35 to 60 wt %, where it's observed that increase in PC content leads to decrease in intensity of the peak with a slight shift towards lower q values. The height of this peak is also related to the number of crystallites (hard segments) per unit volume.

Figure 3:
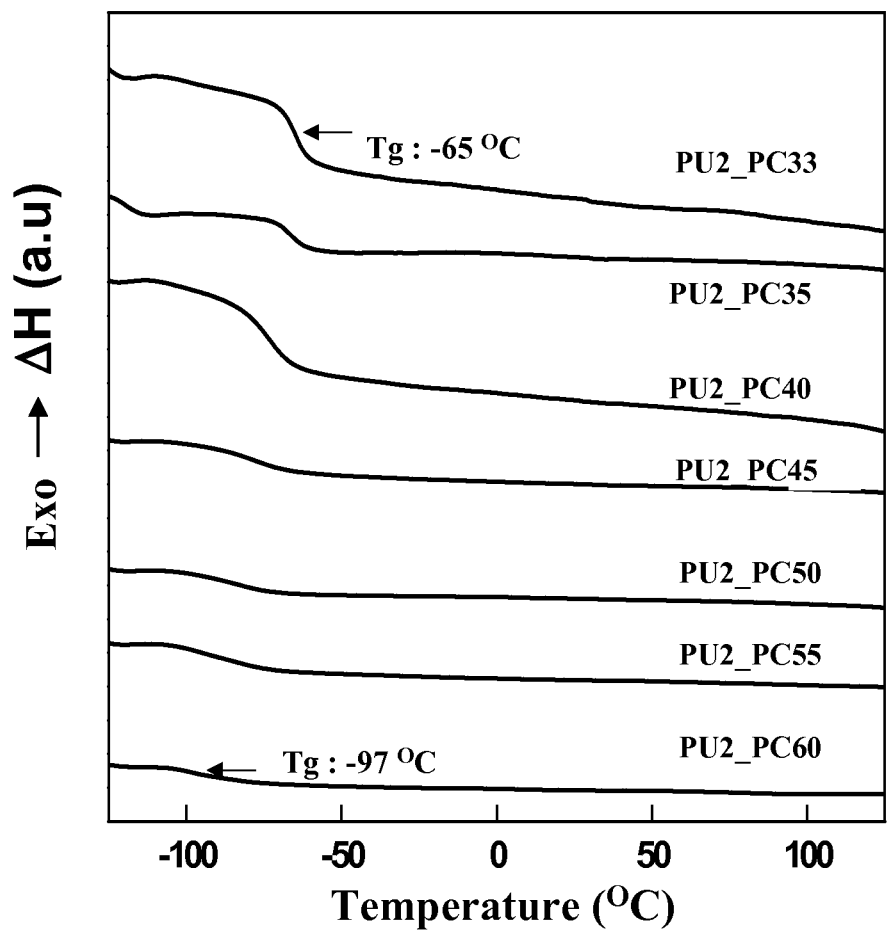
FIG. 3 shows DSC patterns of PU gel based electrolytes with different solvent content.

Differential Scanning Caloriemetry (DSC):

FIG. 3 shows DSC pattern of PU gel electrolytes with varying PC content (35, 40, 45, 50, 55 and 60 wt %). The results are also shown in Table 3. Without being limited to any one theory of operation, DSC studies indicated that there is no crystallization of PU based gel electrolytes.

TABLE 3

| Code | PC (wt %) | $T_g$ (° C.) (DSC) | $T_g$ (° C.) (DMA) |
|---|---|---|---|
| PU2_PC33 | 33 | −65 | −47 |
| PU2_PC35 | 35 | −68 | −49 |
| PU2_PC40 | 40 | −74 | −52 |
| PU2_PC45 | 45 | −80 | −54 |
| PU2_PC50 | 50 | −88 | −58 |
| PU2_PC55 | 55 | −92 | −64 |
| PU2_PC60 | 60 | −97 | −70 |

Figure 4A:
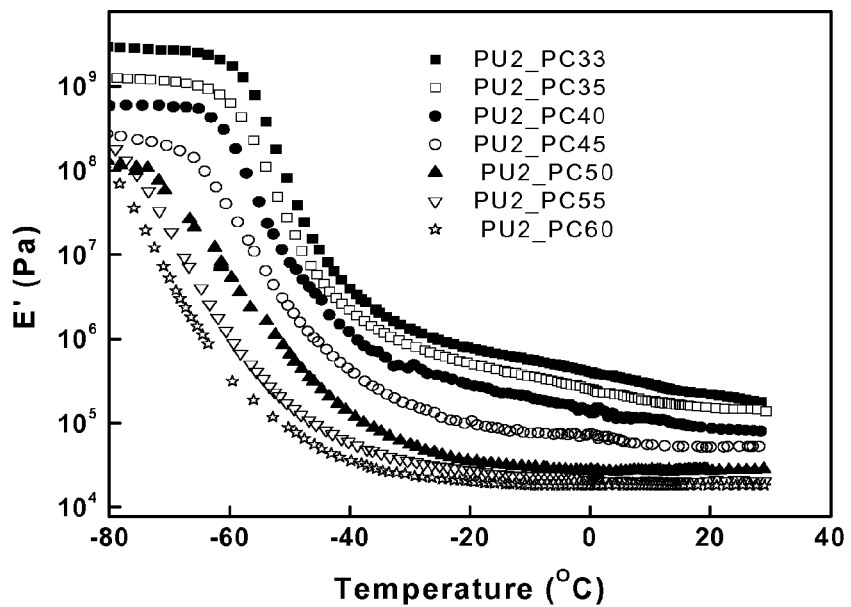
FIG. 4A illustrates the temperature dependence of storage modulus in tensile mode at 1 Hz for PU gel electrolyte with varying PC content of an example embodiment.
Figure 4B:
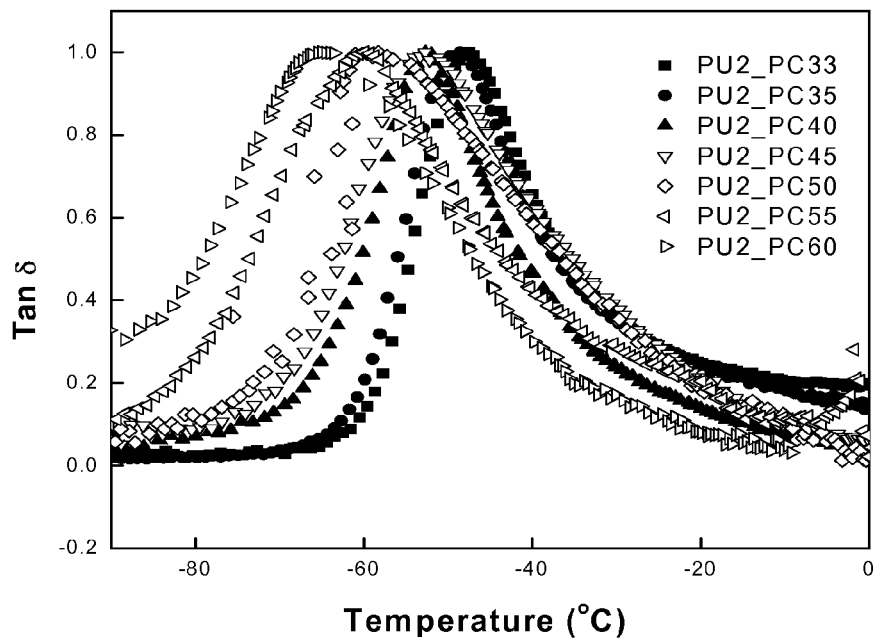
FIG. 4B shows an example embodiment of the variation of the loss tangent (tan δ) at 1 Hz of PU gel electrolyte with temperature.

Dynamic Mechanical Analysis (DMA):

FIG. 4A shows the temperature dependence of storage modulus in tensile mode for PU gel electrolyte with different PC content varying from 33 to 60 wt %, and FIG. 4B shows the variation of the loss tangent (tan δ) of PU gel electrolyte with temperature.

Figure 5:
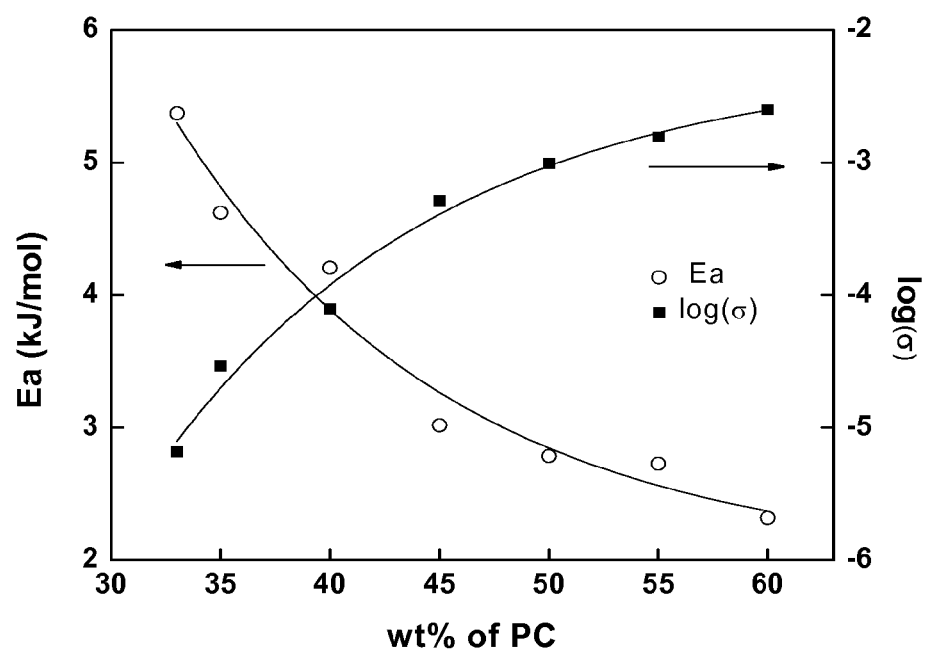
FIG. 5 illustrates the variation of Li$^+$ conductivity at room temperature and activation energy with PC content in the PU gel electrolyte of an example embodiment.

Ionic Conductivity:

FIG. 5 shows the variation of conductivity and activation energy with PC content in the gel. The activation energy of the gel electrolytes decreases with increase in PC content. Without being limited to any one theory of operation, lithium ion mobility was increased with fluidity of the gel (e.g., increased solvent content) and, as a result, increased the conductance. Morphological studies indicated that PU gel electrolyte is homogenous and free from pores.

Figure 6:
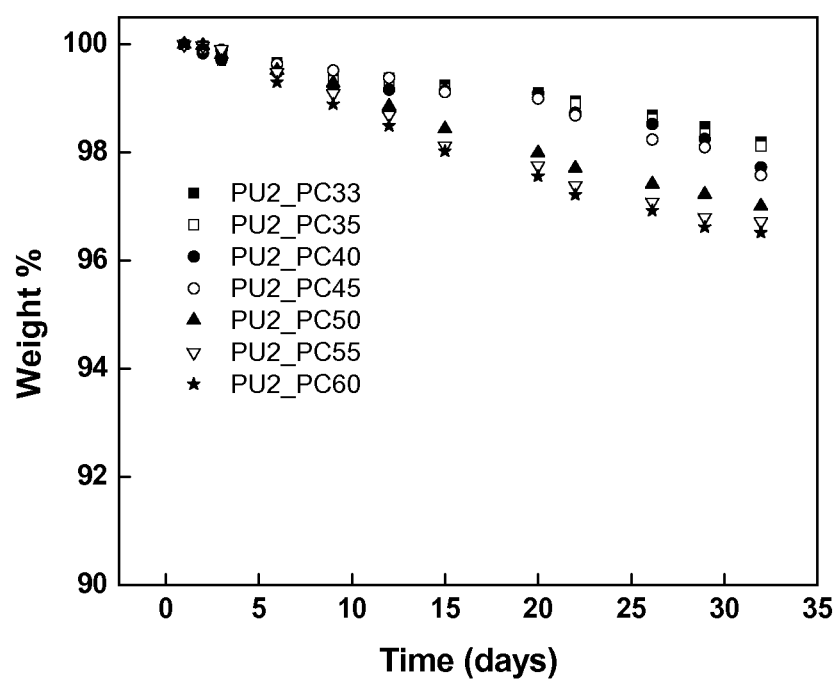
FIG. 6 illustrates the Syneresis effect over time for PU gel electrolyte with varying PC content of an example embodiment.

The rate of solvent exudation with time in the gels was monitored by weight loss measurements. FIG. 6 shows a decrease in weight of the PU gel electrolytes with different PC content varying from 33 to 60 wt % over time. The decrease in weight is seen for all gels, and is attributed to the loss of solvent by exudation. PU gel with 33 wt % of PC solvent shows a loss of 1.5 wt % over 30 days and PU gel with 60 wt % PC solvent shows a loss of 3.5 wt % over the same period.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A gel electrolyte comprising:

a polymer in about 20 to about 70 wt %;

a lithium salt in about 1 to about 8 wt. %; and a solvent comprising a carbonate solvent, a lactone solvent, or a mixture thereof;

wherein the polymer is a polyurethane prepared from a poly(alkyleneoxide) triol and a diisocyanate compound, the polymer is sufficiently cross-linked to form a gel in the presence of the solvent, the poly(alkyleneoxide) triol is selected from:

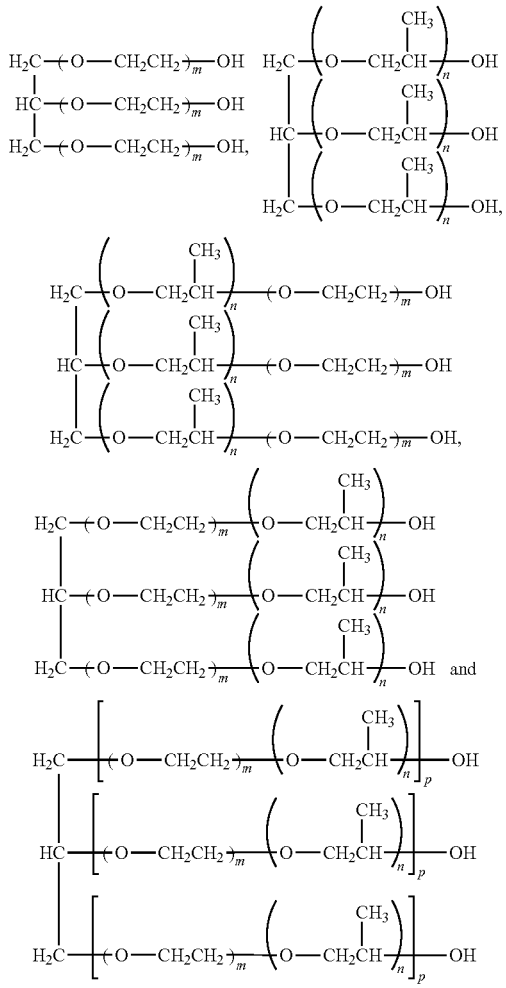

where m, n, and p are selected to form a polymer having molecular weight of about 1,000 to 100,000 g/mol.

2. The gel electrolyte according to claim 1, wherein the poly(alkyleneoxide) triol comprises glycerin-type poly(alkyleneoxide).

3. The gel electrolyte according to claim 1, wherein the poly(alkyleneoxide) triol is

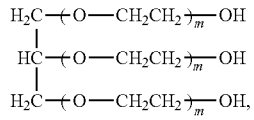

where m is selected to form a polymer having molecular weight of about 1,000 to 100,000 g/mol.

4. The gel electrolyte according to claim 1, wherein the diisocyanate compound is selected from: methylenediphenyl diisocyante (MDI), p-phenylene diisocyante (PPDI), toluene diisocyanate (TDI), o-tolidine diisocyanate (TODI, hexamethylene diisocyanate (HDI), and isophorone diisocyanate (IPDI).

5. The gel electrolyte according to claim 4, wherein the diisocyanate compound comprises 4,4'-methylenediphenyl diisocyante (MDI).

6. The gel electrolyte according to claim 1, wherein the polymer is present in about 25-50 wt %.

7. The gel electrolyte according to claim 1, wherein the polymer is present in about 35 wt %.

8. The gel electrolyte according to claim 1, wherein the lithium salt comprises lithium perchlorate.

9. The gel electrolyte according to claim 1, wherein the lithium salt is present in about 3-6 wt %.

10. The gel electrolyte according to claim 1, wherein the solvent comprises carbonate solvent.

11. The gel electrolyte according to claim 10, wherein the carbonate solvent comprises dimethyl carbonate, diethyl carbonate, propylene carbonate, ethylene carbonate, vinylene carbonate, or a mixture thereof.

12. The gel electrolyte according to claim 10, wherein the carbonate solvent comprises propylene carbonate, ethylene carbonate, or a mixture thereof.

13. The gel electrolyte according to claim 1, wherein the solvent comprises lactone solvent.

14. The gel electrolyte according to claim 13, wherein the lactone solvent comprises β-propiolactone, γ-butyrolactone, α-methyl-γ-butyrolactone, γ-crotonolactone, δ-valerolactone, γ-valerolactone, γ-caprolactone, ε-caprolactone, or mixtures thereof.

15. The gel electrolyte according to claim 13, wherein the lactone solvent comprises γ-butyrolactone.

16. The gel electrolyte according to claim 1, wherein the solvent comprises a mixture of the carbonate solvent and the lactone solvent.

17. The gel electrolyte according to claim 16, wherein the carbonate solvent comprises propylene carbonate or ethylene carbonate, and the lactone solvent is γ-butyrolactone.

18. A battery comprising:
an anode;
a cathode;
a gel electrolyte between the anode and the cathode where the gel electrolyte includes
a polymer in about 20 to about 70 wt %;
a lithium salt in about 1 to about 8 wt. %; and
a solvent comprising a carbonate solvent, a lactone solvent, or a mixture thereof; wherein the polymer is a polyurethane prepared from a poly(alkyleneoxide) triol and a diisocyanate compound, the polymer is sufficiently cross-linked to form a gel in the presence of the solvent, the poly(alkyleneoxide) triol is selected from:

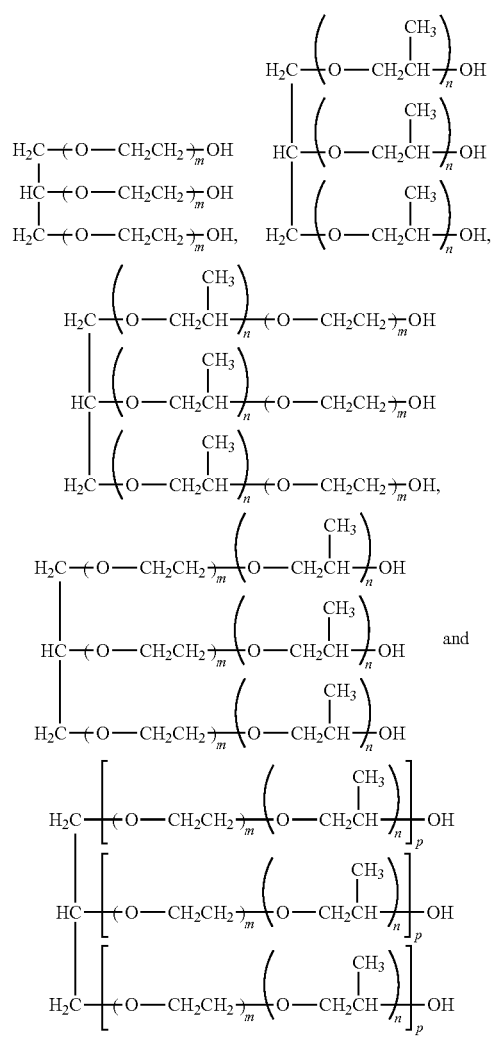

where m, n, and p are selected to form a polymer having molecular weight of about 1,000 to 100,000 g/mol.

* * * * *

UNITED STATES PATENT AND TRADEMARK OFFICE
CERTIFICATE OF CORRECTION

PATENT NO. : 8,673,503 B2  
APPLICATION NO. : 12/794261  
DATED : March 18, 2014  
INVENTOR(S) : Ramamurthy Balaji et al.

Page 1 of 1

It is certified that error appears in the above-identified patent and that said Letters Patent is hereby corrected as shown below:

On Title Page 2, in Item (56), under "OTHER PUBLICATIONS", in Column 1, Line 16, delete "LiClO4" and insert -- $LiClO_4$ --, therefor.

In the Specification:

In Column 4, Line 50, delete "(TODD," and insert -- (TODI), --, therefor.

In Column 9, Line 51, delete "-14 $nm^{-1}$," and insert -- ~14 $nm^{-1}$, --, therefor.

In the Claims:

In Column 13, Line 17, in Claim 4, delete "(TODD," and insert -- (TODI), --, therefor.

In Column 14, Line 5, in Claim 18, delete "includes" and insert -- includes: --, therefor.

Signed and Sealed this  
First Day of July, 2014

Michelle K. Lee  
*Deputy Director of the United States Patent and Trademark Office*